(12) United States Patent  
Liu et al.

(10) Patent No.: US 12,280,429 B2  
(45) Date of Patent: Apr. 22, 2025

(54) SYSTEMS AND METHODS FOR DEFECT DETECTION AND CORRECTION IN ADDITIVE MANUFACTURING PROCESSES

(71) Applicant: Sentient Science Corporation, Buffalo, NY (US)

(72) Inventors: Jingfu Liu, Prior Lake, MN (US); Behrooz Jalalahmadi, Long Island City, NY (US); Ziye Liu, West Lafayette, IN (US); Andrew Vechart, Minnetrista, MN (US); Xiawa Wu, Erie, PA (US)

(73) Assignee: Sentient Science Corporation, Buffalo, NY (US)

( * ) Notice: Subject to any disclaimer, the term of this patent is extended or adjusted under 35 U.S.C. 154(b) by 0 days.

(21) Appl. No.: 18/450,018

(22) Filed: Aug. 15, 2023

(65) Prior Publication Data

US 2024/0293870 A1 Sep. 5, 2024

Related U.S. Application Data

(63) Continuation of application No. 17/009,945, filed on Sep. 2, 2020, now Pat. No. 11,724,315.

(51) Int. Cl.
*B22F 10/85* (2021.01)
*B22F 10/28* (2021.01)
(Continued)

(52) U.S. Cl.
CPC .............. *B22F 10/85* (2021.01); *B22F 10/28* (2021.01); *B23K 26/0093* (2013.01);
(Continued)

(58) Field of Classification Search
CPC ...... B22F 10/85; B22F 10/28; B22F 2999/00; B22F 10/364; B23K 26/0093;
(Continued)

(56) References Cited

U.S. PATENT DOCUMENTS 10,046,412 B2 * 8/2018 Blackmore .......... G01N 23/203
10,675,684 B2 * 6/2020 DeFelice ................. B23P 15/00
(Continued)

OTHER PUBLICATIONS

Behrooz "In-process defect monitoring and correction in additive manufacturing of aluminum alloys" Presented at the Vertical Flight Society's 75th Annual Forum & Technology Display, Philadelphia, PA, USA, May 13-16, 2019.75th—annual.*

*Primary Examiner* — Lawrence Averick

(57) ABSTRACT

A system and method of additive manufacturing is disclosed herein which when run or performed form a product with a powder-based additive manufacturing device by adding sequential layers of material on top of one another. As each sequential layer of material is added, the system and method can include monitoring the sequential layer with a defect analysis subsystem to detect whether the sequential layer has any defects. For a detected defect, it can be determined whether defect correction is required. For a required defect correction, one or more correction parameters for the required defect correction can be identified; and a correction command including the one or more correction parameters can be sent to the additive manufacturing device, the correction command causing the additive manufacturing device to help correct the detected defect in the sequential layer according to the correction parameters prior to moving on to a next sequential layer.

9 Claims, 17 Drawing Sheets

(51) Int. Cl.
*B23K 26/00* (2014.01)
*B23K 26/342* (2014.01)
*B33Y 10/00* (2015.01)
*B33Y 30/00* (2015.01)
*B33Y 50/02* (2015.01)
*G01N 21/88* (2006.01)
*G06T 7/00* (2017.01)

(52) U.S. Cl.
CPC ............ *B23K 26/342* (2015.10); *B33Y 10/00* (2014.12); *B33Y 30/00* (2014.12); *B33Y 50/02* (2014.12); *G01N 21/8851* (2013.01); *G06T 7/001* (2013.01); *G06T 2207/10048* (2013.01); *G06T 2207/30136* (2013.01)

(58) Field of Classification Search
CPC ...... B23K 26/342; B33Y 10/00; B33Y 30/00; B33Y 50/02; G01N 21/8851; G06T 7/001; G06T 2207/10048; G06T 2207/30136; B21J 5/00
See application file for complete search history.

(56) References Cited

U.S. PATENT DOCUMENTS

2015/0034606 A1* 2/2015 Blackmore ............ B23K 15/02
219/76.14
2017/0312821 A1* 11/2017 DeFelice ................ B22F 10/50

\* cited by examiner

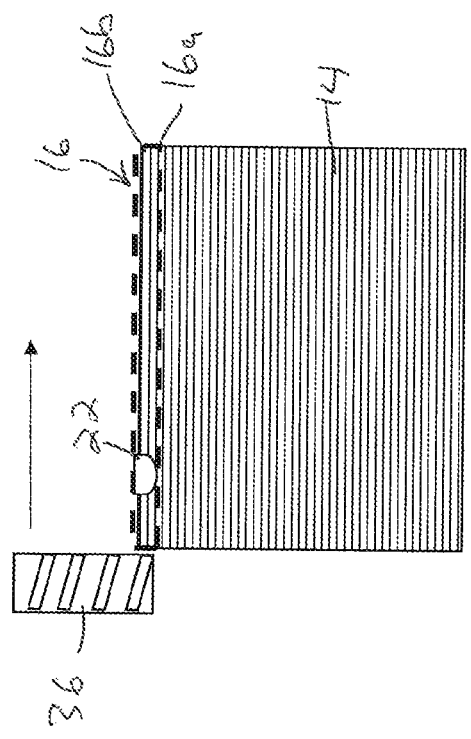
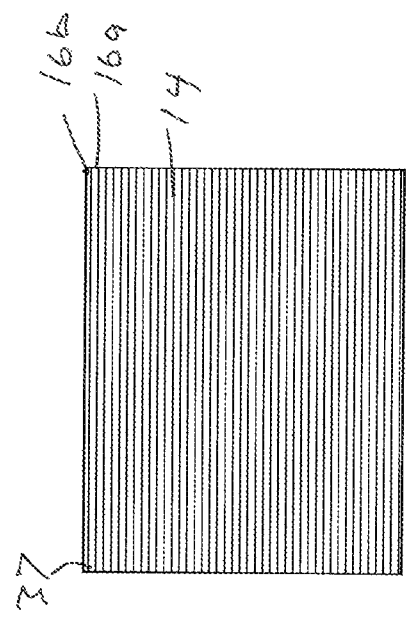
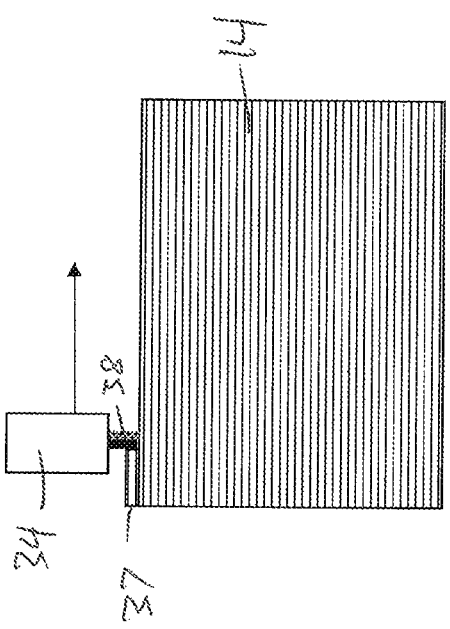
FIG. 7a
FIG. 7b
FIG. 7c
FIG. 7d

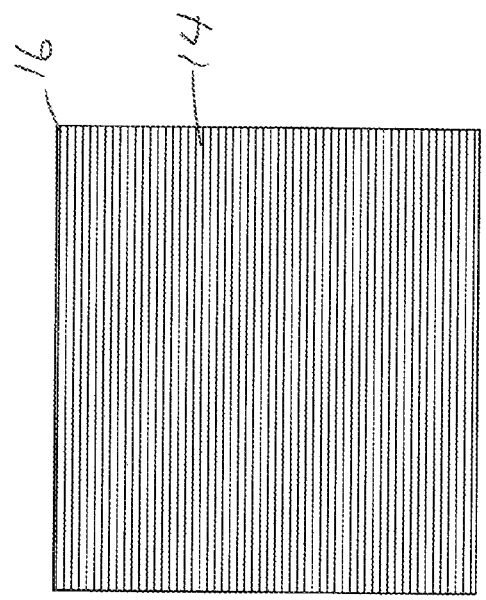
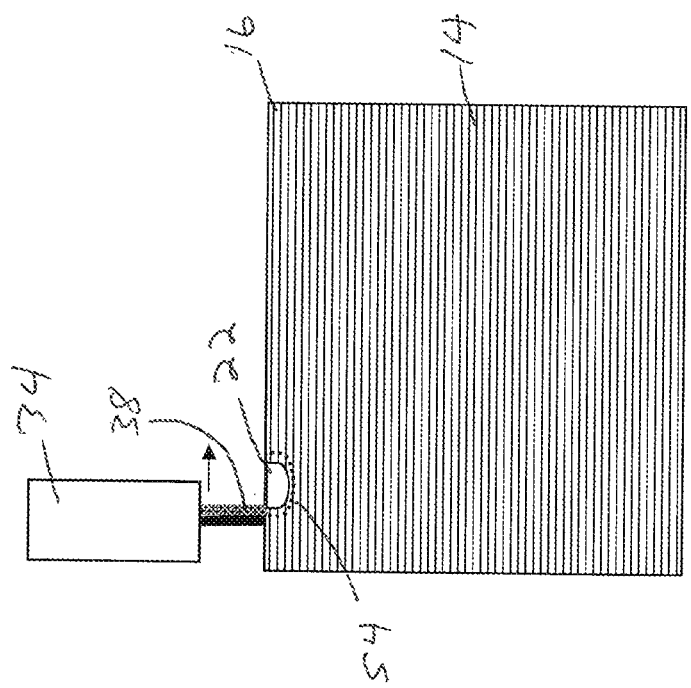

Porosity 13.21%

Porosity 4.70%

Database of Defect Profiles (DP) and Corresponding Correction Parameters

| Defect Profile | Laser Power | Scan Speed | Normal Energy Density |
|---|---|---|---|
| DP1 | LP1 | SS1 | ED1 |
| DP2 | LP2 | SS2 | ED2 |
| DP3 | LP3 | SS3 | ED3 |
| DP4 | Lp4 | SS4 | ED4 |
| DP5 | LP5 | SS5 | ED5 |
| DP6 | LP6 | SS6 | ED6 |
| DP7 | LP7 | SS7 | ED7 |
| DPi... | LPi... | Ssi... | Edi... |

FIG. 16

SYSTEMS AND METHODS FOR DEFECT DETECTION AND CORRECTION IN ADDITIVE MANUFACTURING PROCESSES

CROSS-REFERENCES TO RELATED APPLICATIONS

This application is a continuation of U.S. patent application Ser. No. 17/009,945, entitled "SYSTEMS AND METHODS FOR DEFECT DETECTION AND CORRECTION IN ADDITIVE MANUFACTURING PROCESS", which was filed on Sep. 2, 2020. The entirety of this reference is hereby incorporated by reference.

STATEMENT REGARDING FEDERALLY SPONSORED RESEARCH OR DEVELOPMENT

The subject matter herein was funded in part by Small Business Innovation Research (SBIR) Contract Nos. W911W6-18-C-0006 and W911W6-19-C-0006 with the United States Army.

A portion of the disclosure of this patent document contains material that is subject to copyright protection. The copyright owner has no objection to the reproduction of the patent document or the patent disclosure, as it appears in the U.S. Patent and Trademark Office patent file or records, but otherwise reserves all copyright rights whatsoever.

REFERENCE TO SEQUENCE LISTING OR COMPUTER PROGRAM LISTING APPENDIX

Not Applicable

BACKGROUND OF THE INVENTION

The present disclosure relates generally to powder-based additive manufacturing processes: laser powder bed fusion (LPBF), electron beam melting (EBM), etc. Powder-based additive manufacturing involves building a part in a layer-by-layer manner, wherein powder material can be subsequently added and heated in layers to form a desired product.

More particularly, the present disclosure relates to detecting defects in products manufactured using an additive manufacturing process or technique. Recent progress with the use of additive manufacturing (AM), especially powder bed fusion processes, has demonstrated the capability to manufacture complex components as a single part, which may save manufacturing labor and costs, and reduce production time. A key challenge for laser-based powder bed fusion (LPBF) additive manufacturing is addressing defects that are introduced into the part during the build process. Various types of defects can form during the AM processes, such as porosity, un-melted particles, grain anisotropy, balling effects, material inhomogeneity, residual stress, distortion, etc. High-energy density in AM processes can cause a balling effect that results in high surface roughness and microstructural in-homogeneities, while a low-energy density usually causes material discontinuities, such as porosity and delamination of adjacent passes/layers. Appropriate process parameters are essential to building defect-free parts, and most commercial metal AM machines have built-in parameter settings that are supposed to print defect-free parts. However, in an actual printing process, inherent variability of AM processes (e.g. random distribution of AM powder, melt pool flow, denudation process) can cause deviation from ideal preset conditions, resulting in process defects.

Currently, systems are provided that can monitor a part as it is being created to identify defects as they occur, but processing of that information is done once a build is complete. While it might be feasible in rare cases to fix outer facing defects in the part with post-machining processes, generally speaking any parts with internal defects are thrown out as scrap, which can create considerable waste (as well as a reduction of productivity) and increase costs for the manufacturer.

Additionally, over time, an additive manufacturing machine can begin to deviate or become decalibrated from its desired operational settings, such that subsequent runs of manufactured parts or products can increasingly have more and more defects produced in them. Calibration or recalibration of the additive manufacturing device can be required in such circumstances. Currently, detection of increasing defects in an additive manufacturing process that may be the result of an improperly calibrated machine is done by happenstance if an operator notices an increase in defective products over time. As such, machines can be operated improperly over extended periods of time, which can increase waste and costs associated with manufacturing defective products.

What is needed then are improvements in additive manufacturing processes.

BRIEF SUMMARY

This Brief Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

One aspect of the disclosure is a method of additive manufacturing including forming a product with an additive manufacturing device by adding sequential layers of material on top of one another. As each sequential layer of material is added, the method can further include: monitoring the sequential layer with a defect analysis subsystem to detect whether the sequential layer has any defects; for a detected defect, determining whether defect correction is required; for a required defect correction, identifying one or more correction parameters for the required defect correction; and sending a correction command with the one or more correction parameters to the additive manufacturing device, the correction command causing the additive manufacturing device to perform the correction procedure to help correct the detected defect in the current sequential layer according to the correction parameters prior to moving on to a next sequential layer.

Another aspect of the present disclosure is a method of additive manufacturing including the steps of: forming a product with an additive manufacturing device by adding sequential layers of material on top of one another. For at least one of the sequential layers of material, the method further comprises monitoring the sequential layer as it is being added with a defect analysis subsystem to detect a defect; determining that a defect correction is required to repair the defect; identifying one or more correction parameters for the defect correction; and sending a correction command with the one or more correction parameters to the additive manufacturing device, the correction command causing the additive manufacturing device to perform the correction procedure to help correct the detected defect in the current sequential layer according to the correction parameters prior to moving on to a next sequential layer.

Another aspect of the present disclosure is a system of correcting defects in an additive manufacturing process including an additive manufacturing device operable to form a product by adding sequential layers of material on top of one another; and a defect analysis subsystem communicated with the additive manufacturing device, wherein as each sequential layer of material is added, the defect analysis subsystem is operable to: monitor the sequential layer to detect whether the sequential layer has any defects; for a detected defect, determine whether defect correction is required; for a required defect correction, identify one or more correction parameters for the required defect correction; and sending a correction command with the one or more correction parameters to the additive manufacturing device, the correction command causing the additive manufacturing device to perform the correction procedure to help correct the detected defect in the sequential layer according to the correction parameters prior to moving on to a next sequential layer.

The system and methods disclosed herein can provide a way for defects formed in the additive manufacturing process to be corrected during the build process, such that the defect can be corrected and the build can be completed. This provides an advantage over current methods wherein products are rejected and discarded mid-process or once the product is completed.

Numerous other objects, advantages and features of the present disclosure will be readily apparent to those of skill in the art upon a review of the following drawings and description of a preferred embodiment.

BRIEF DESCRIPTION OF THE DRAWINGS

FIGS. 7a-7d are side views of a product being corrected according to the correction method of FIG. 6.

FIGS. 9a-9b are side views of a product being corrected according to the correction method of FIG. 8

FIG. 12b is a side view of an observed melt pool from an experimental remelting procedure utilizing the same operational parameters as the simulated remelt procedure of FIG. 12a.

FIG. 16 is a table of an exemplary defect profile and correction parameter database that can be utilized to identify correction parameters suitable to correct detected defects matching particular defect profiles.

DETAILED DESCRIPTION

Figure 1:
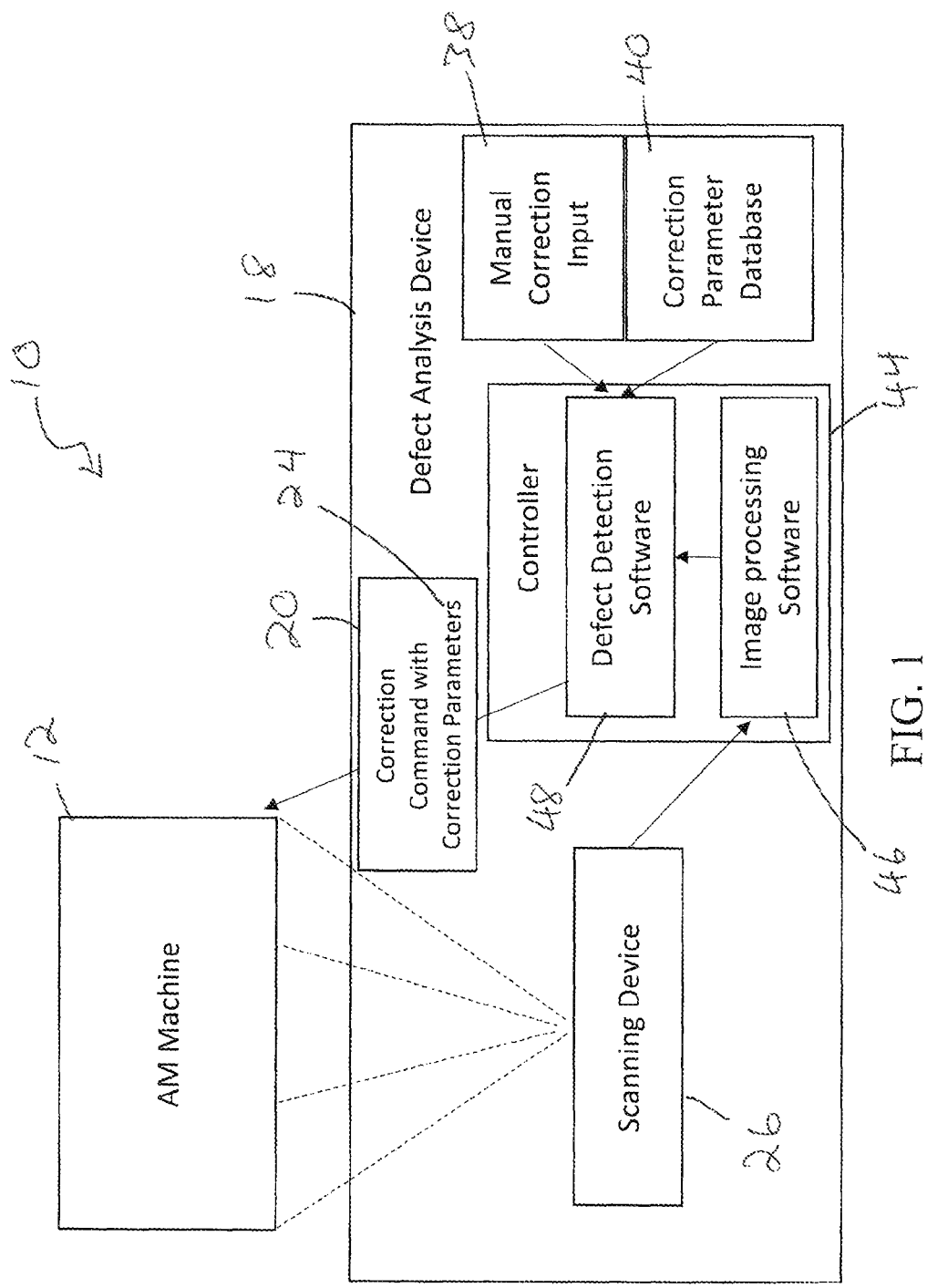
FIG. 1 is a schematic diagram of an exemplary system of the present disclosure for detecting and correcting defects in an additive manufacturing process.

While the making and using of various embodiments of the present invention are discussed in detail below, it should be appreciated that the present invention provides many applicable inventive concepts that are embodied in a wide variety of specific contexts. The specific embodiments discussed herein are merely illustrative of specific ways to make and use the invention and do not delimit the scope of the invention. Those of ordinary skill in the art will recognize numerous equivalents to the specific apparatus and methods described herein. Such equivalents are considered to be within the scope of this invention and are covered by the claims.

In the drawings, not all reference numbers are included in each drawing, for the sake of clarity. In addition, positional terms such as "upper," "lower," "side," "top," "bottom," etc. refer to the apparatus when in the orientation shown in the drawing. A person of skill in the art will recognize that the apparatus can assume different orientations when in use.

One aspect of the present disclosure, as shown in FIGS. 1-5, is a system 10 of correcting defects in an additive manufacturing process including an additive manufacturing device 12 operable to form a product 14 by adding sequential layers 16 of material on top of one another; and a defect analysis subsystem 18 communicated with the additive manufacturing device 12, wherein as each sequential layer 16 of material is added, the defect analysis subsystem 18 can be operable to: monitor the sequential layer 16 to detect whether the sequential layer 16 has any defects 22; for a detected defect 22, determine whether defect correction is required; for a required defect correction, identify one or more correction parameters 24 for the required defect correction; and sending a correction command 20 with the one or more correction parameters 24 to the additive manufacturing device 12, the correction command 20 causing the additive manufacturing device 12 to perform a correction procedure to help correct the detected defect 22 in the sequential layer 16 according to the correction parameters 24 prior to moving on to a next sequential layer 16.

In some embodiments, once the correction procedure is performed and prior to the additive manufacturing device 12 moving onto the next sequential layer, the defect detective subsystem 18 can monitor the sequential layer 16 during the correction procedure to detect the presence of any new or remaining defects after the correction procedure is performed. If new or remaining defects are detected, then the defect analysis subsystem 18 can: determine whether correction is required for the new or remaining defect; for a required new or remaining defect correction, identify a second set of one or more correction parameters 24 for the required new or remaining defect correction; and send a second correction command with the second set of one or more correction parameters to the additive manufacturing device 12, the second correction command causing the additive manufacturing device 12 to perform a second correction procedure to help correct the new or remaining detected defect in the sequential layer 16 according to the second set of correction parameters prior to moving on to a next sequential layer. Multiple correction procedures can be performed in this manner on a sequential layer 16 as needed before moving on to the next sequential layer to help ensure the current sequential layer 16 no longer includes any defects requiring correction. In some embodiments, correction procedures may still produce defects in the sequential layer, but defects after the correction procedure may be acceptable such that the additive manufacturing device can move on to the next layer.

In some embodiments, the defect analysis subsystem 18 can include a monitoring device 26 for monitoring the sequential layers 16 of the product 14 during the build process. The monitoring device 26 can include any suitable device for monitoring, scanning, sensing, or detecting defects in the sequential layer 16. In some embodiments, the monitoring device 26 can include an imaging system 28 including but not limited to, a thermal imaging system. Thermal imaging systems 28 can help detect unexpected differences in process temperature that can be indicative of undesirable process change, or defects 22, in the product 14.

In one embodiment, the thermal imaging system 28 can include an infrared (IR) camera that can be used to view the AM process. The infrared camera 28 can include a "sensor engine" based on a quantum well infrared photodetector (QWIP) focal plane array (FPA) in an integrated dewar/cooler assembly which uses a Stirling cycle mechanical cooler to cool the FPA to a desired temperature. The infrared camera 28 can in some embodiments have LWIR, MWIR, or SWIR spectrum. The infrared camera 28 can have sampling rate that ranges from a few Hz to several KHz. Though in some embodiments, microbolometer cameras, or any other suitable infrared camera, can be used for the imaging system 26. The camera 28 can be placed inside or outside the AM chamber 30. If outside mounting is chosen, the AM chamber 30 can have a port 32 that is normally blanked off but can include a transparent medium window which was specified to have at least 70% transmission in the pass-band of the infrared camera 28. The setup is shown in FIG. 2.

Figure 2:
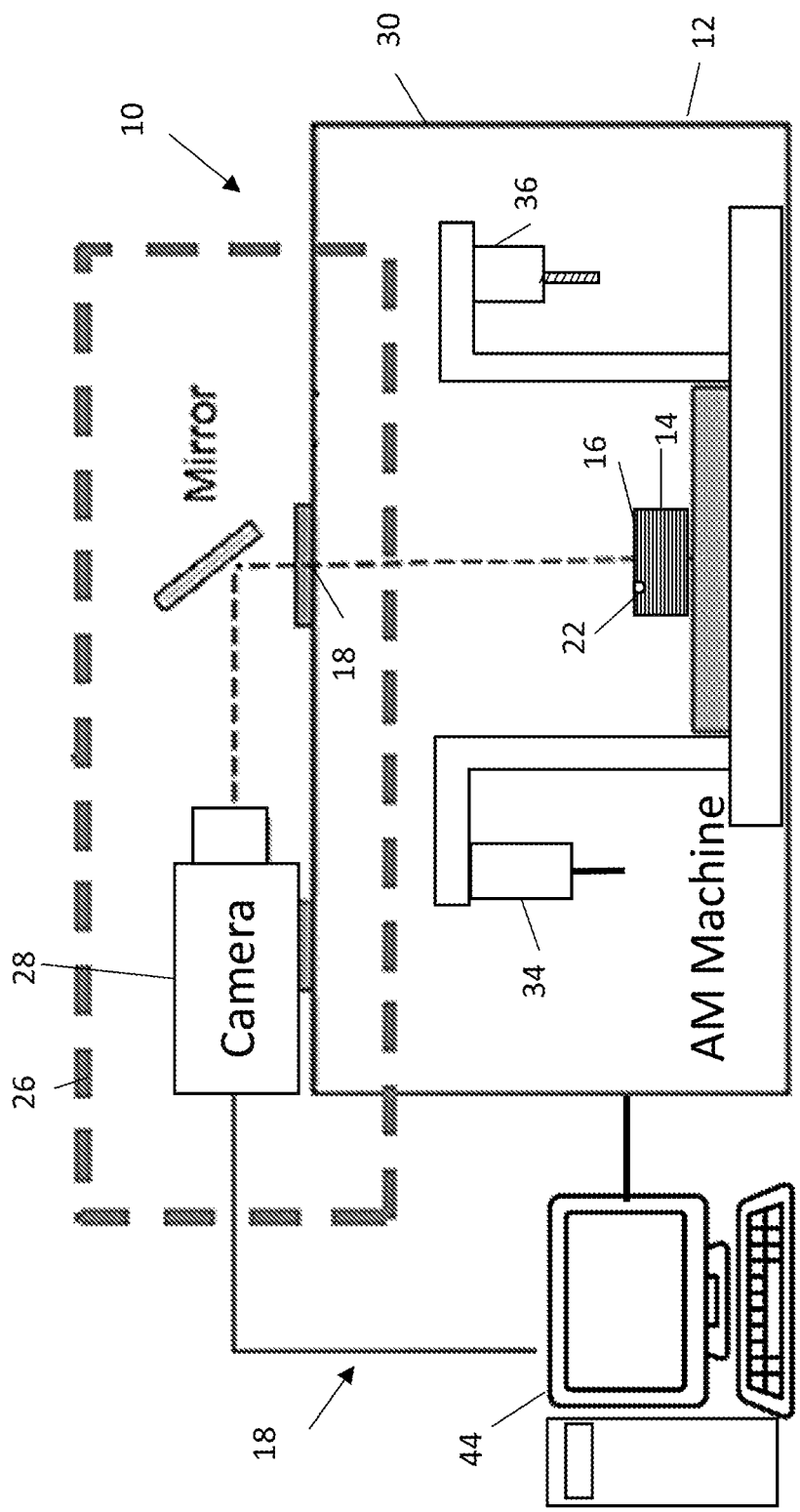
FIG. 2 is a schematic diagram of another exemplary system of the present disclosure for detecting and correcting defects in an additive manufacturing process including an additive manufacturing device with machining capabilities.
Figure 3:
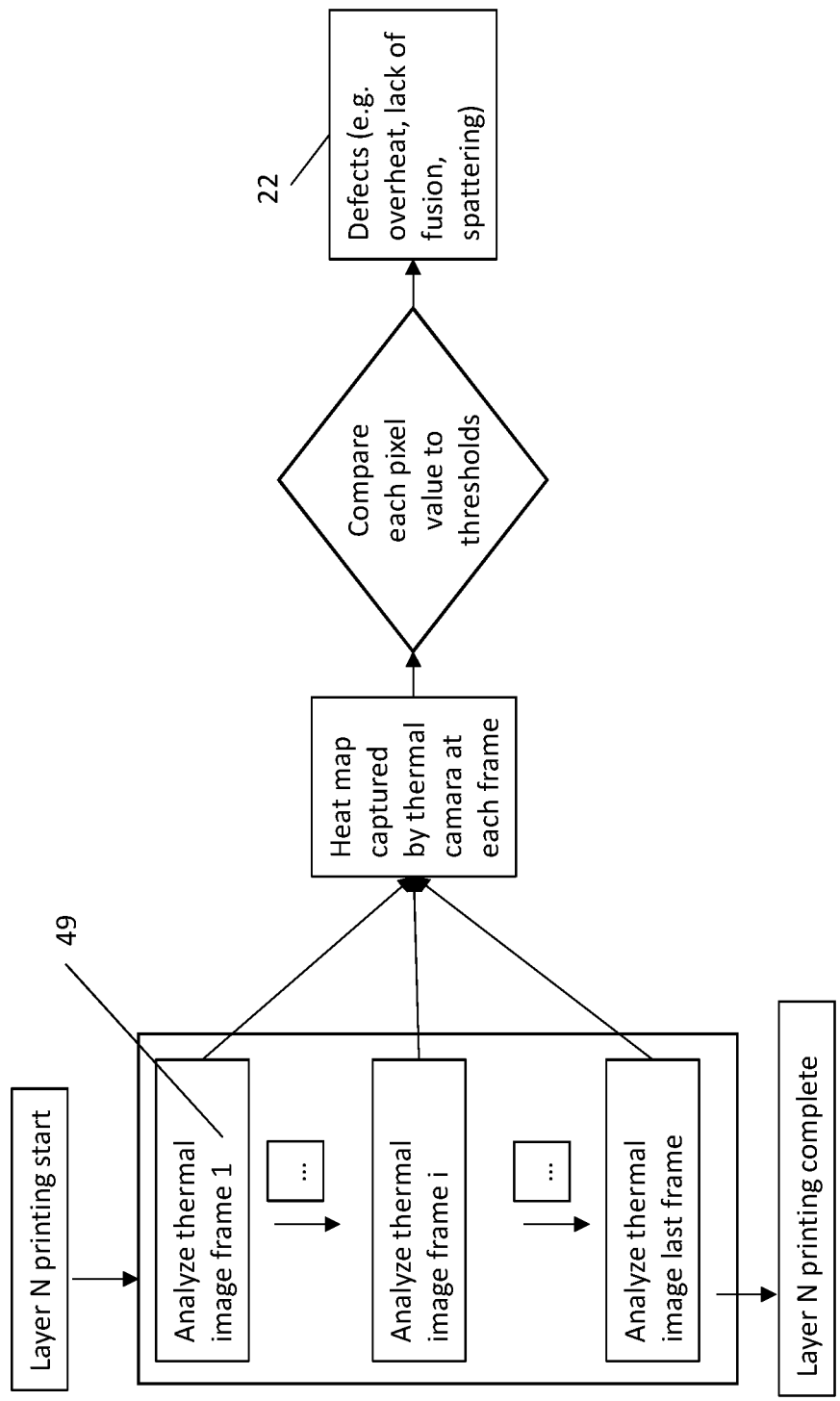
FIG. 3 is a flow diagram of a process for determining whether defects exist in a sequential layer of a product based on processing of captured images of the sequential layer from a monitoring/scanning device.
Figure 4:
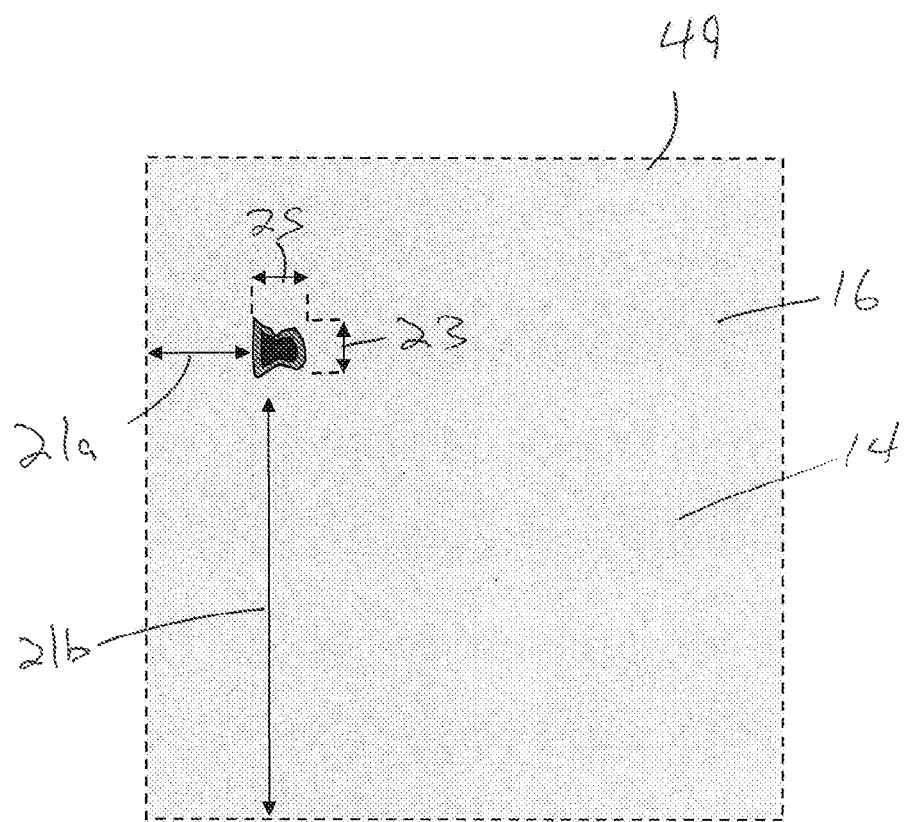
FIG. 4 is an exemplary image frame of a sequential layer being formed, the image captured from a thermal scanning device.
Figure 5:
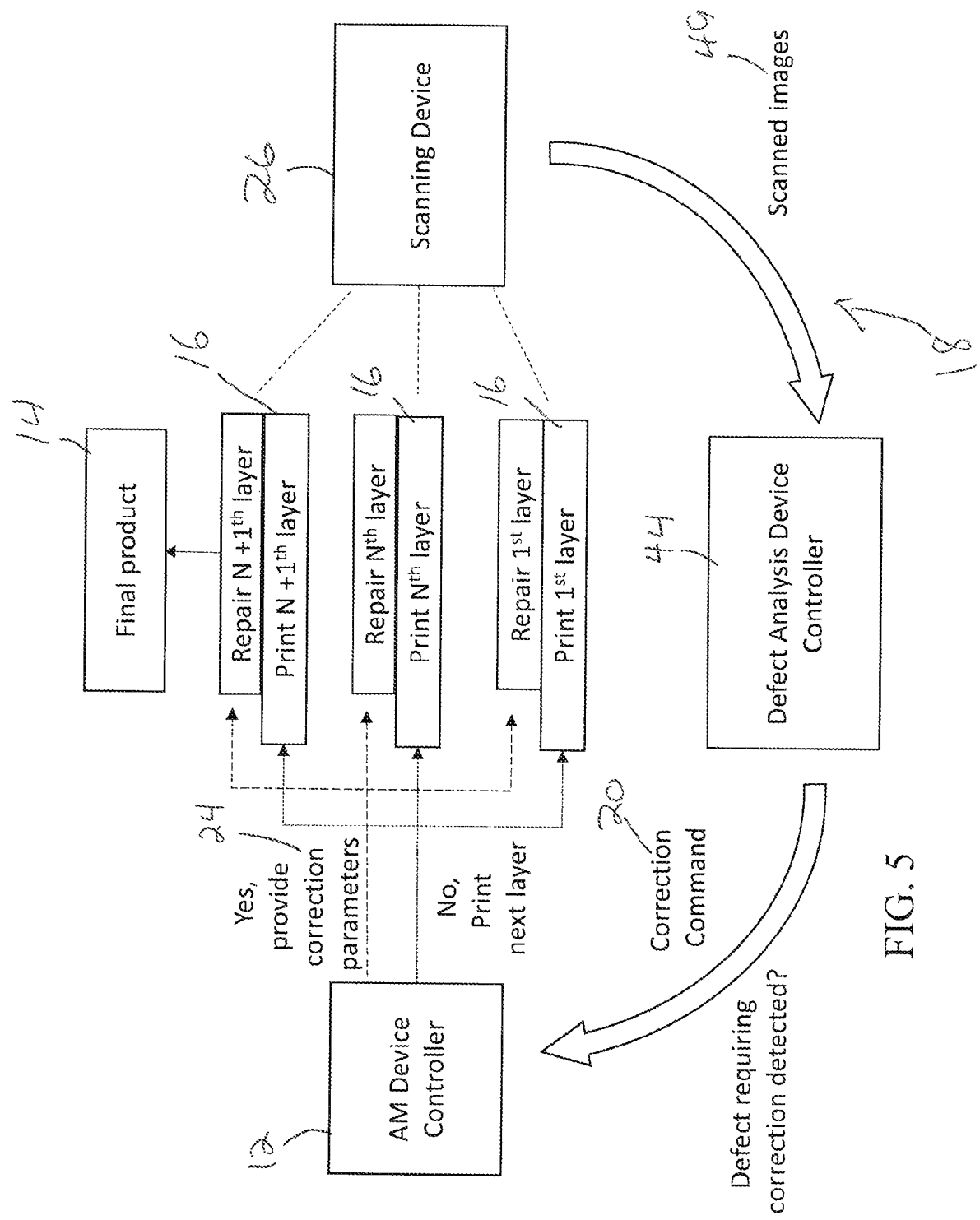
FIG. 5 is a diagram of an exemplary system and method for repairing detected defects during an additive manufacturing process.

While the embodiment shown in FIG. 2 utilizes an infrared camera system 28 for monitoring and taking thermal images of sequential layers 16 of a product 14 for defects 22, any suitable monitoring device 26 can be utilized to detect defects 22 in the product 14. Such devices can include, but are not limited to, optical scanners, magnetic field sensors, electric current sensors, etc.

As can be seen in FIGS. 1-4, defects in a sequential layer 16 can be detected in a variety of ways. In some embodiments, a defect analysis subsystem controller 44 can include image processing software 46 and defect detection software 48. In each sequential layer 16 analyzed, thermal image frames 49 captured from the scanning device 26 can be analyzed using the image processing software 46. Radiance or heat maps of the thermal images showing melted areas and cool down areas of the sequential layer 16 can be processed by the image processing software 46. The defect detection software 48 can analyze the heat maps captured in each frame 49 and compare identified characteristics from the heat maps with predetermined thresholds. The defect detection software 48 can determine different types of defects, including but not limited to overheating defects, lack of fusion defects, and spattering defects, by comparing the identified characteristics from the heat maps and comparing them to threshold amounts for each defect type.

The image processing software 46 and/or the defect detection software 48 can also identify on the radiance map in each image frame 49 individual defects or voids in the sequential layer 16 by analyzing the radiance map to determine locations of the void on the frame 49. Defects 22 in the sequential layer 16 can be evidenced by areas of lower temperature on the radiance map of the sequential layer 16. The position, including the x and y coordinates 21a and 21b of the defect 22 within the frame 49, and also the size of the defect, including the width 23 and length 25 of a detected defect 22, can be determined from the image frames 49. Knowing the size of the defect 22 can help identify the proper correction parameters 24 for the correction command 20 sent to the AM device 12 as discussed herein, and knowing the position of the defect 22 can help ensure the AM device 12 applies the corrective procedure to appropriate area of the sequential layer 16. In other embodiments such as optical scanners, magnetic field sensors, and electric current sensors, similar image frames 49 can be produced with optical scanning information, magnetic field information, or electric current information to map the surface contour of the sequential layer 16.

Figure 6:
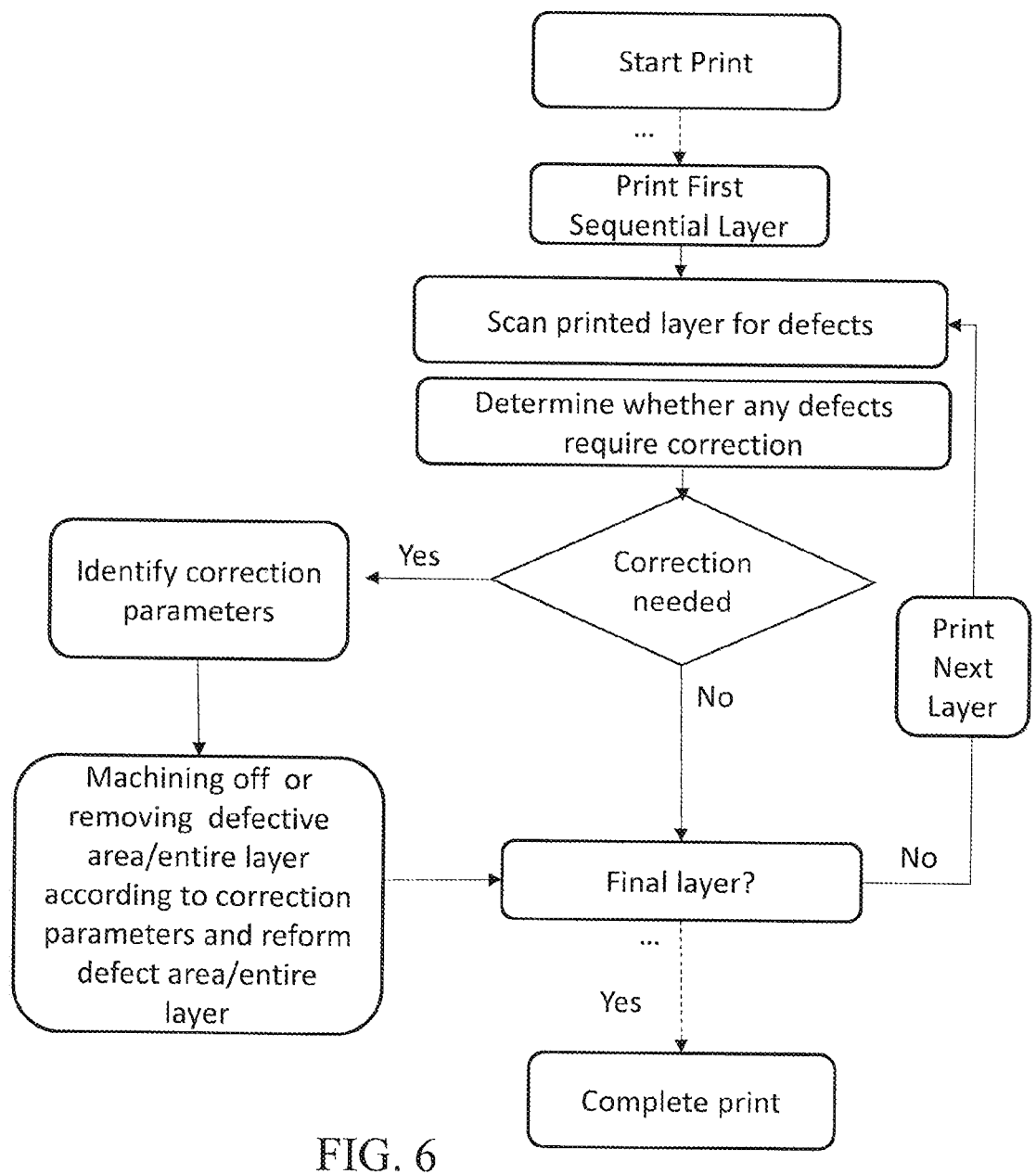
FIG. 6 is a flow diagram of an exemplary system and method for repairing detected defects during an additive manufacturing process wherein the defect or the entire sequential layer is machined off and reformed.

Referring now to FIGS. 2 and 6-7, in some embodiments, the additive manufacturing device 12 can be equipped with a high energy density beam 34 such as a laser, as well as one or more machining elements 36 such as drilling devices, milling devices, grinding devices, lathes, saw devices, etc. which can allow for certain machining operations of parts to be performed in addition to powder melting operations. Machining elements 36 on additive manufacturing devices are currently used to shape and make modifications to completed parts. In some embodiments, the defect analysis subsystem 18 can utilize the machining elements 36 on an AM device 12 to help correct defects 22 detected in products 14. In some embodiments, the correction parameters 24 provided in the correction command 20 can include instructions to remove at least a portion of the sequential layer 16 around the defect 22, and/or the entire sequential layer 16 with the machining elements 36 and reform the sequential layer 16 with the high energy density beam 34 of the additive manufacturing device 12.

As shown in FIGS. 7a-7d, in some embodiments, when a defect 22 is detected the correction command can cause the additive manufacturing device 12 to machine off the entire sequential layer 16 to remove the defect 22 with the one or more machining elements 36. The sequential layer 16 can then be reformed in its entirety with the high energy density beam 34 which can heat and melt a new layer 37 of powder 38 to reform the sequential layer 16. In other embodiments, only a portion of the sequential layer 16 around the defect 22 can be machined off and reformed with the high energy density beam 34. In still other embodiments, it may be necessary to remove and reform multiple sequential layers 16, for instance when a defect 22 created during the forming of a sequential layer 16 affects an adjacent sequential layer 16.

In some embodiments, when a defect 22 is detected, the defect analysis subsystem 18 may determine that the defect needs correction, but the defect analysis subsystem 18 can hold off on making the correction and take the detected defect 22 into account when analyzing the next subsequent layer 16. The formation of the next subsequent layer 16 may fix the previously detected defect 22, or the formation of the next sequential layer 16 may exacerbate the previously detected defect 22, in which case the defect analysis subsystem 18 could be programmed to send a correction command that would effectively correct defects in both sequential layers 16. As such, a subsequent layer 16 can include two or more sublayers 16a, 16b, 16c, etc. forming the subsequent layer 16, such that multiple sublayers 16a, 16b can be analyzed collectively to determine the effects of a later sublayer on a defect detected in a prior sublayer before correction is made.

Figure 8:
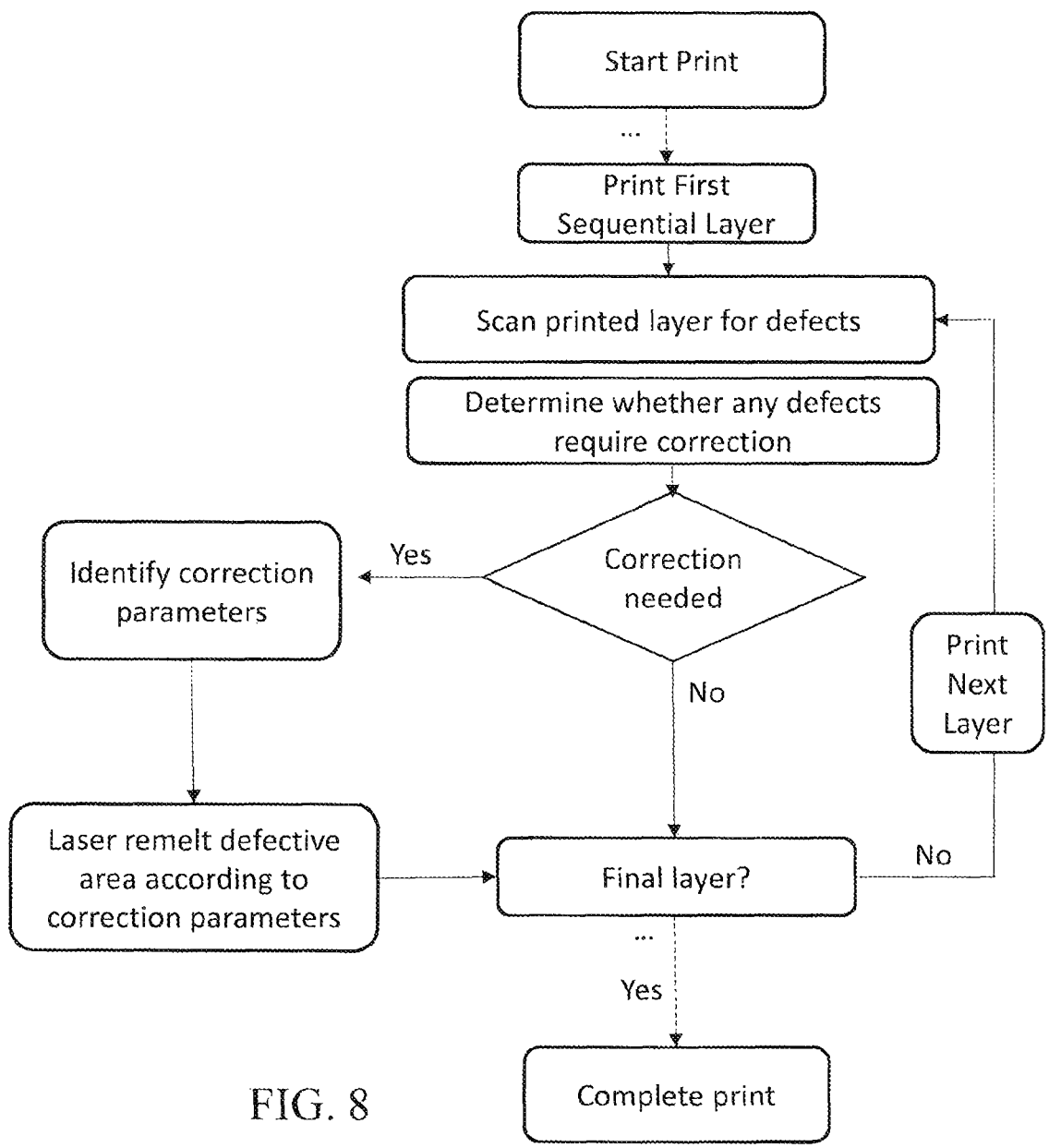
FIG. 8 is a flow diagram of an exemplary system and method for repairing detected defects during an additive manufacturing process wherein a remelt procedure is utilized to help correct the detected defect in the sequential layer.

As shown in FIGS. 8-9, in some embodiments, the correction parameters of the correction command can include instructions to form a melt pool 54 at desired operating parameters around the defect 22 to provide a correction procedure to help correct the defect 22 in the sequential layer 16. Melting the area around the defect 22 can include applying heat via a laser or other high energy density beam 34 around the defect 22 to remelt the area around the defect 22, or form a melt pool 54 around the defect 22, at the desired correction parameters, thereby helping to correct the defect 22. In some embodiments, additional material 38 can be added during the remelt process, for instance to fill a void defect 22.

Figure 13:
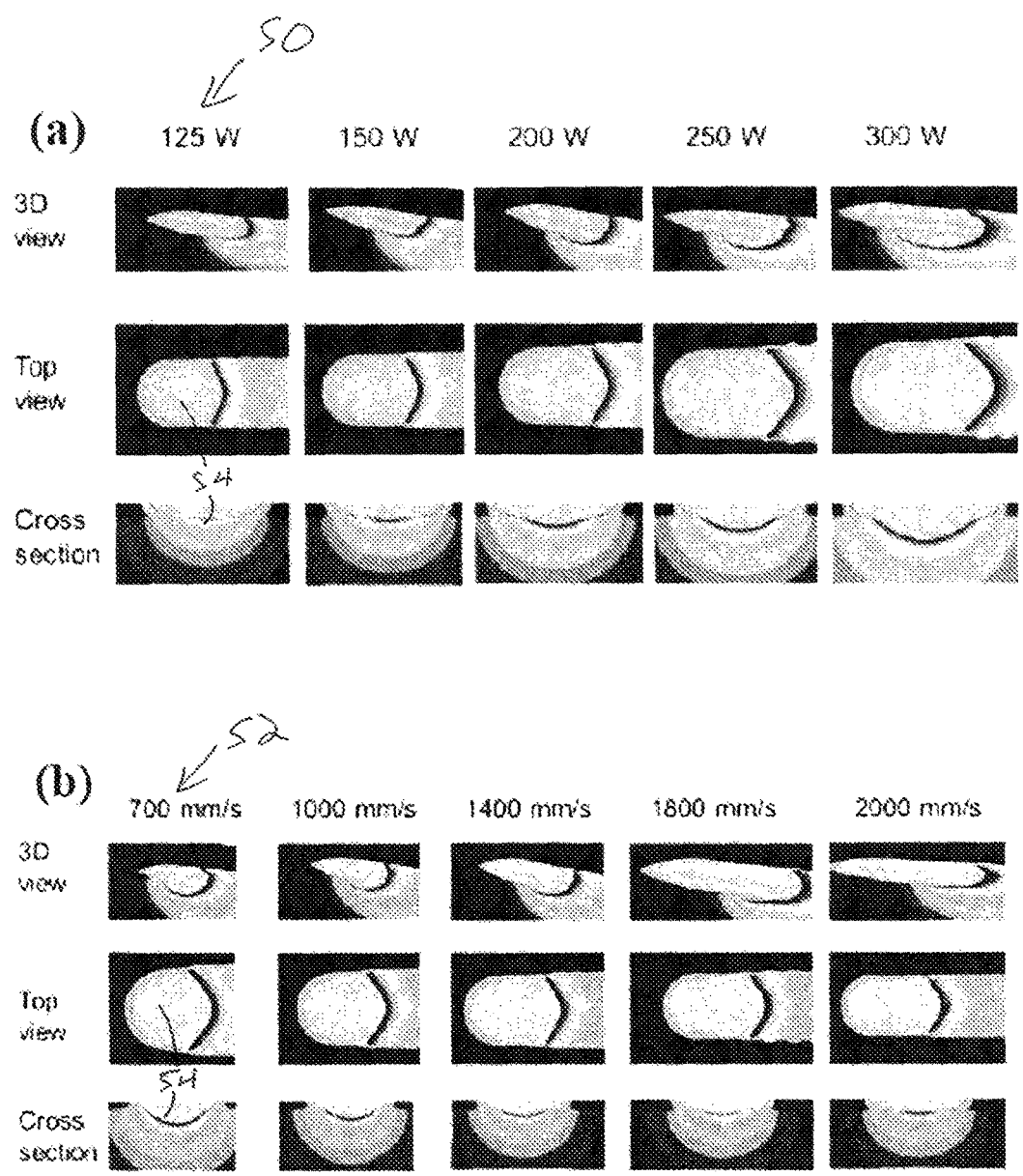
FIG. 13 includes multiple diagrams of perspective views, top views, and cross-sectional views of simulated melt pools of melting procedures using increasing laser power and increasing scan speeds.

As shown in FIG. 13, laser power 50 and laser scan speed 52 can be adjustable parameters for real-time laser correction purposes, because they are two easily adjustable parameters that need minimal control and configuration. As the laser power 50 increases, the melt pools 54 became larger and their size increases in all three dimensions (length, width, and depth). When increasing the laser scan speed 52, the melt pool 54 tends to become shallower but longer. Various combinations of laser powers 50 and scan speeds 52 can thus produce melt pools 54 of various dimensions (lengths, widths and depths) to correct a detected defect. When defects are to be corrected, appropriate laser repair parameters are required to fix the in-situ defects without causing additional defects.

Referring to FIGS. 1 and 16, in some embodiments, the defect analysis subsystem 18 can further include a database 40 including a plurality of defect profiles 42 and corresponding suggested correction parameters 24 for each defect profile 42, and when the defect analysis subsystem 18 determines that a defect 22 requires correction, the defect analysis subsystem 12 can be operable to select one of the defect profiles 42 in the database 40 that is an approximation of the detected defect 22 and include the suggested correction parameters 24 corresponding to the selected defect profile 42 in the correction command 20 sent to the additive manufacturing device 12. Having a database 40 including readily available correction parameters 24 for corresponding defect profiles 42 can allow optimal laser correction parameters 24 to be quickly determined based on a detected size and geometry of any void or defect. Other AM parameters (e.g. powder layer thickness, spot size) can remain fixed in some embodiments, or can also be adjustable and vary between different repair processes. In some embodiments, correction parameters 24 can be set for each defect profile 42 such that each set of parameters has nominal energy density between about 50% and about 150%. Nominal energy density outside of this range has proven to result in high porosity in the resulting product.

As shown in FIGS. 10-16, the database 40 can be compiled from simulated analyses of various correction procedures having different laser powers 50 and laser speeds 52 to determine an optimal set of correction parameters 24 for different defect profiles 42. Detected defects can then be approximated to a corresponding defect profile 42 in the compiled database 40, for instance by using a width and depth of the detected defect 22 and finding the closest matching defect profile 42 in the database 40.

Figure 10:
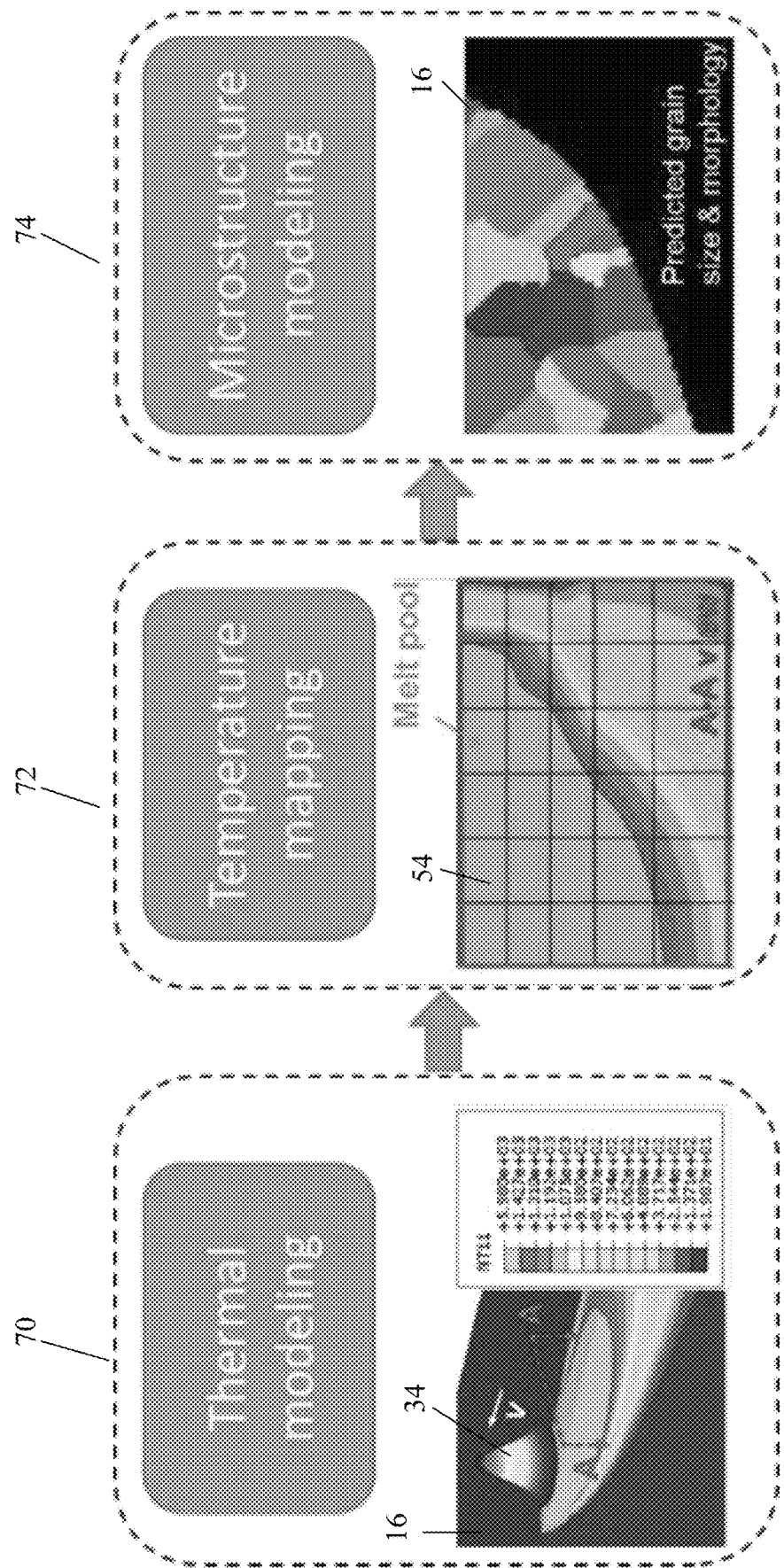
FIG. 10 is a flow chart of a process for simulating and modeling the effect of a heat flux from a high energy density beam on a product which can be utilized to help model potential defect correction or repair procedures.
Figure 11A:
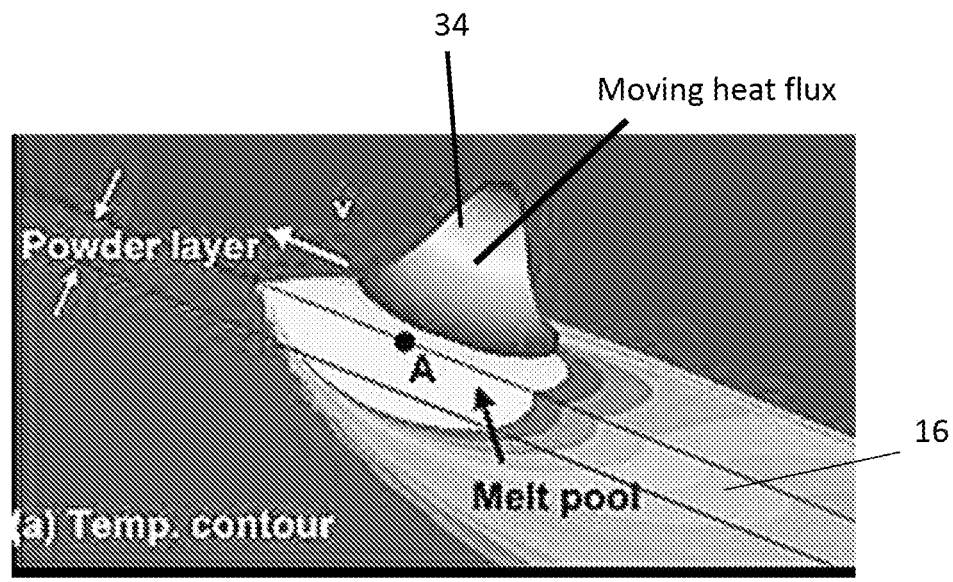
FIG. 11a is a perspective view of a simulated high energy density beam being passed over a product.
Figure 11B:
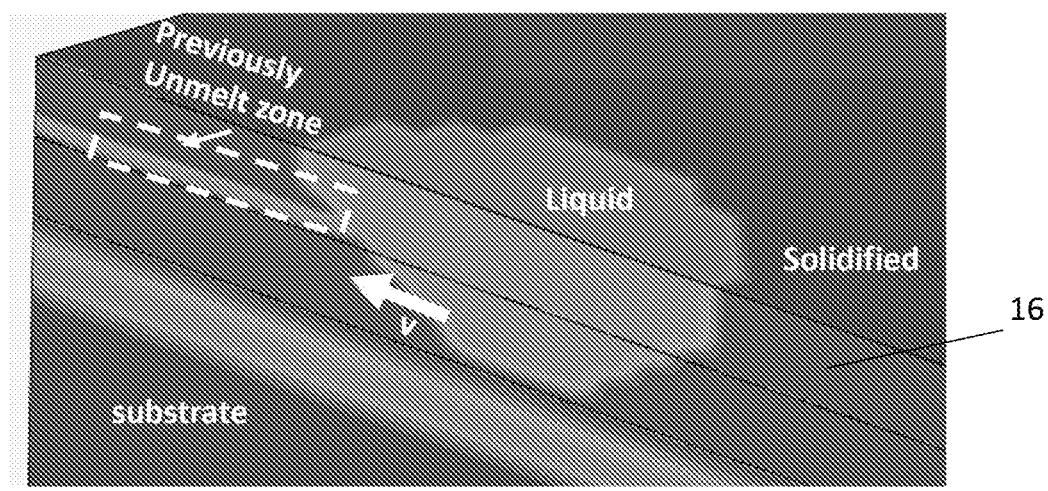
FIG. 11b is a perspective view of a simulated product of FIG. 11a once the remelting procedure is completed and the product begins to solidify.
Figure 12A:
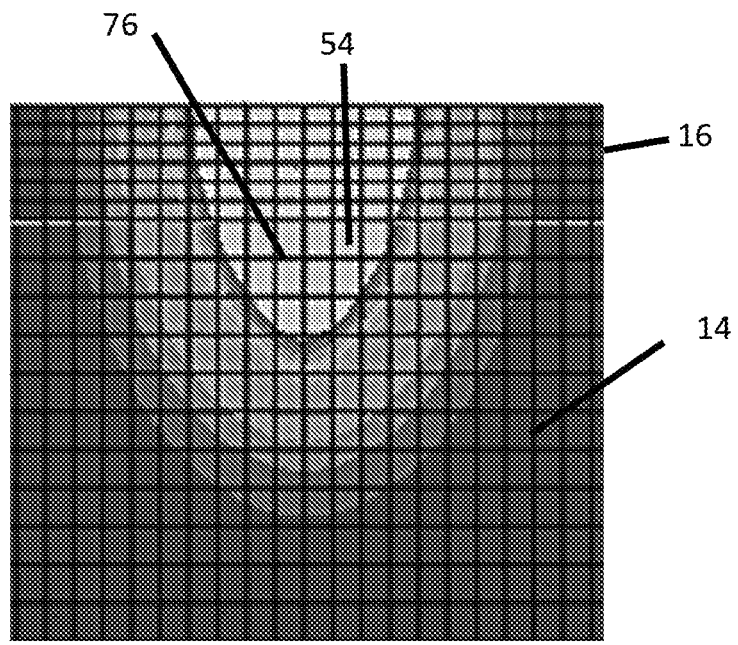
FIG. 12a is a side view of a simulated melt pool created by a particular combination of laser power and scanning speed during a simulated remelt procedure.
Figure 12B:
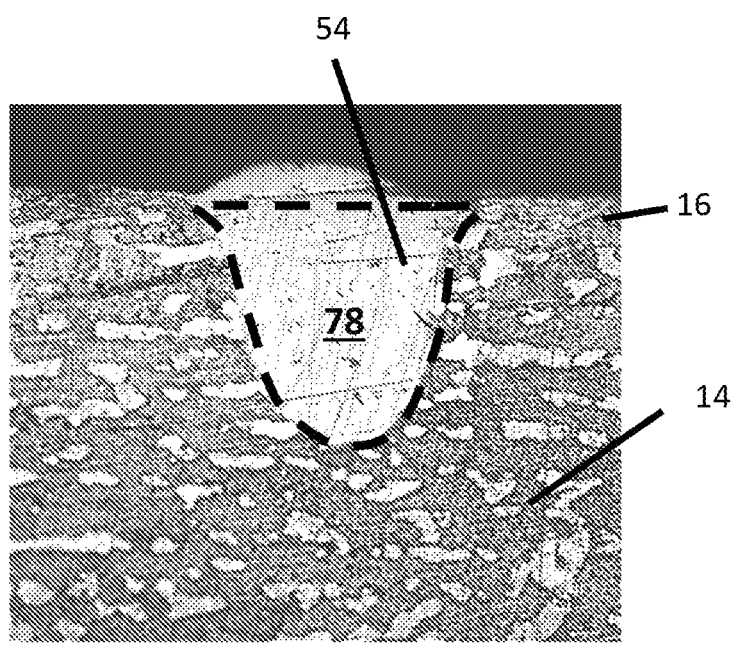

Defect repair procedures can be simulated according to the modeling process shown in FIGS. 10-12. A thermal model 70 of the heat flux from the high energy density beam 34 being applied to the sequential layer 16 can be created, and that thermal model 70 can then be used to produce a temperature mapping model 72 in response to the simulated heat flux within the sequential layer 16. A microstructure model 74 can be simulated for the sequential layer 16 and the product 14 which can predict grain structure and porosity of the sequential layer 16 due to the simulated heat flux of the thermal model 70 and the temperature mapping model 72. In one exemplary embodiment, the heat flux can be simulated by the following equation:

$$q(x, y) = \frac{AP}{\pi r_0^2} \exp\left[-B\left(\frac{r(x, y)}{r_0}\right)^2\right] \quad \text{Eq. 1}$$

where q(x, y) is the heat flux intensity, A is the material absorbability to the laser energy which depends on powder properties, laser type and laser settings. P is laser power, $r_0$ is the radius of laser spot which can be obtained from machine vendors, B is the shape factor of the Gaussian heat flux which is dependent on laser type and mode, and r(x, y) is the radial distance to the laser beam center which is a function of laser scan speed, printing time, as well as a hatch space in multiple-track simulation. Among those parameters, P can be obtained directly from machine settings, and coefficients of A, $r_0$, B can be calibrated through melt pool dimension, which can be easily obtained using single-track experimentation. As can be seen in FIG. 12, a simulated melt pool shape 76 can be compared to an observed melt pool shape 78 to calibrate the heat flux coefficients in Eq. 1. While one exemplary heat flux model has been shown herein, defect repair procedures can be simulated using any suitable heat flux or thermal models.

Figure 14A:
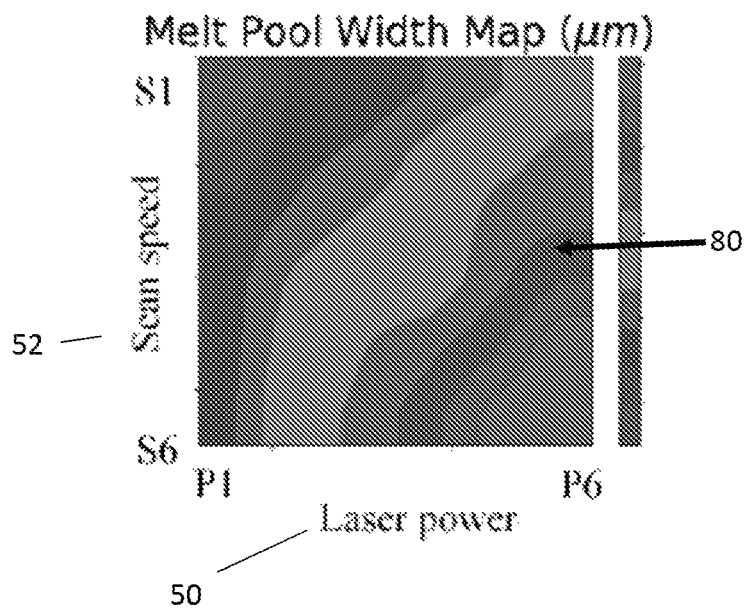
FIG. 14a is an exemplary melt pool width map plotting melt pool widths against varying combinations of laser scan speeds and laser power.
Figure 14B:
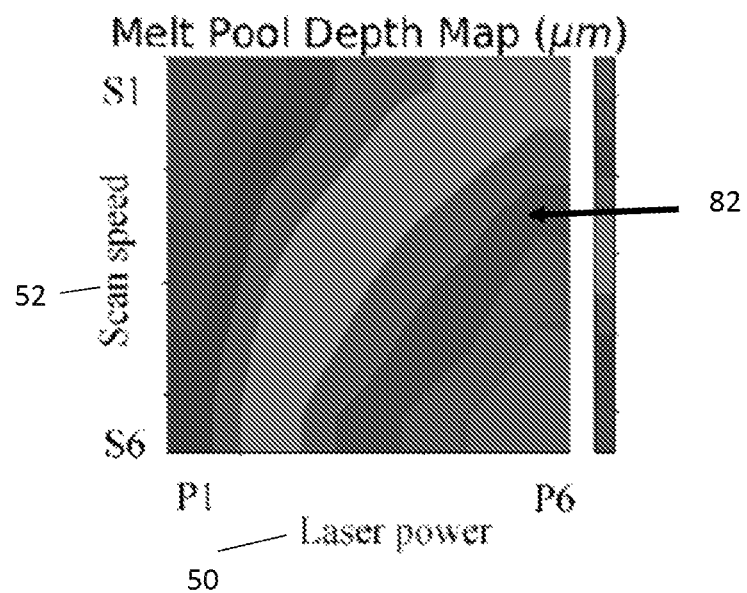
FIG. 14b is an exemplary melt pool depth map plotting melt pool depths against varying combinations of laser scan speeds and laser power.
Figure 15A:
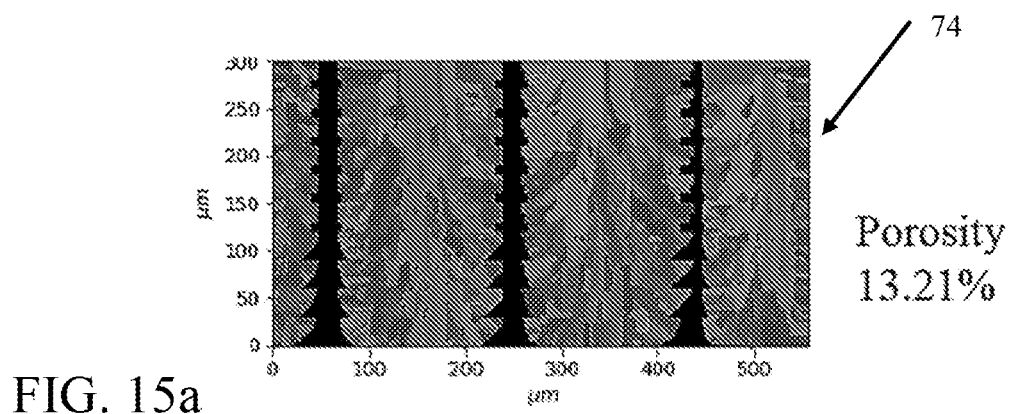
FIG. 15a is a microstructure model of a product after a simulated defect correction procedure utilizing a low laser power and high scan speed.
Figure 15B:
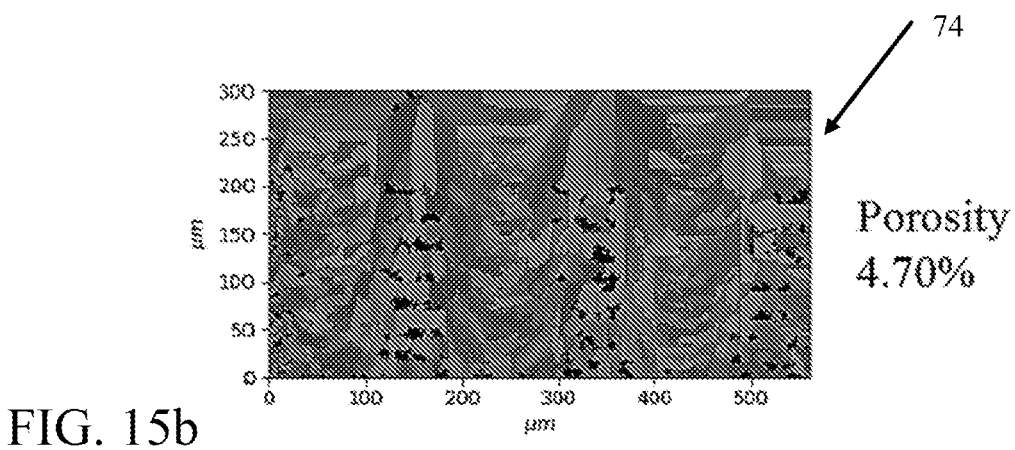
FIG. 15b is a microstructure model of a product after a simulated defect correction procedure utilizing a higher laser power and lower scan speed.
Figure 15C:
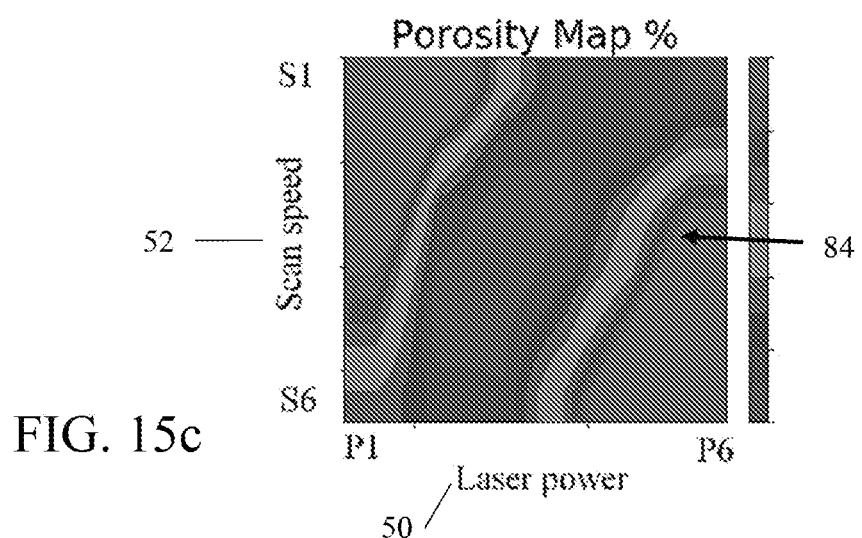
FIG. 15c is a porosity map showing the porosity created in a product against varying combinations of laser scan speeds and laser power.

Simulations can be run with the modeling procedure of FIG. 10 for various combinations of laser power and laser scan speeds to determine depths, widths, and porosities associated with different repair procedures. Exemplary melt pool width and depth maps 80 and 82 respectively based on such simulations are shown in FIG. 14, and exemplary microstructure models 74 and porosity maps 84 are shown in FIG. 15. Scan speed 52 increases from S6 to S1, and laser power 50 increases from P1 to P6. As previously noted as laser power 50 increases, or scan speed 52 decreases, melt pool width and depth increases. Porosity, however, generally increases with low laser power 50 settings and high scan speeds 52 (lack of fusion defects) or high laser power 50 settings and low scan speeds 52 (keyhole defects).

When a defect is detected, the width and depth of the defect can be determined as the images from the scanning device are processed. The widths and depths of the detected defect can be correlated with the melt pool width and depth maps 80 and 82 to determine acceptable laser power 50 and scan speeds 52 to produce a corrective melt pool having similar depth and width. The suitable laser power 50 and scan speed 52 combinations can then be correlated with the porosity map 84 to determine the pair of suitable laser power 50 and scan speeds 52 that produces the lowest porosity in the product. Thus, correction parameters for a detected defect can be optimized by querying a database of potential repair simulations to determine optimal correction parameters.

In some embodiments, as shown in FIG. 16, a database 40 of defect profiles 42 having predetermined widths and depths can be compiled which matches or associates the defect profiles 42 with corresponding correction parameters 24 including desired laser power 50 and laser scan speeds 52 which when implemented create melt pools having similar dimensions as the defect profiles 42. As such, a correction procedure utilizing the corresponding correction parameters 24 associated with a particular defect profile 42 can be implemented to correct a defect having similar dimensions as the defect profile 42. The database 40 can be regenerated before each build to take into account varying material properties of powder material used for the build, or multiple sets of data for different materials can be included in the database 40, and prior to the build the relevant material can be selected such that the defect analysis subsystem can query the correct data set when a defect is detected.

Referring to FIGS. 8 and 16, in some embodiments, the correction parameters 24 associated with each defect profile 42 and selected for a given defect 22 can cause the melt pool 54 to have a melt pool size that is at least about 20 percent, at least about 25 percent, at least about 30 percent, or at least about 40 percent greater than a size of the defect 22. The relative sizes of the melt pool 54 and the defect 22 can be based on volume or a top surface area of the melt pool 54 and the defect 22. The relative sizes of the melt pool 54 and the defect 22 can also be based on the relative sizes of the widths and depths of the melt pools and the defects. Having the melt pool 54 size being larger than the defect 22 size can help ensure that the entire defect 22 is remelted and thus corrected during the corrective remelting process.

Referring again to FIGS. 1-5, in some embodiments, the defect analysis subsystem 18 can include a manual correction command input 38, and determining whether the defect 22 requires correction further comprises receiving a manual correction command 20 to provide a correction procedure to help correct the defect 22 at the manual correction command input 38. In such embodiments, the defect analysis subsystem 18 can prompt a user with information about a detected defect 22 such as size, location, effect on part life or quality, etc. and the user can determine whether a correction is required. The user can then provide a manual input command 20 via the manual correction command input 38 for the defect 22 to be corrected via the additive manufacturing device 12. In some embodiments, the defect analysis subsystem 18 can also include correction parameter inputs that can allow a user to manually input or identify correction parameters such as laser power, laser scan speed, etc. that will be implemented for the correction procedure performed by the additive manufacturing device 12.

In some embodiments, in order to determine whether a correction is required, the defect analysis subsystem 18 can be operable to determine a size of the defect 22 and be programmed to require correction if the size of the defect 22 exceeds a predetermined minimum defect size or if a ratio of the size of the defect 22 to the size of the sequential layer 16 exceeds a predetermined minimum defect ratio. For instance, the defect analysis subsystem 18 can be programmed to require correction if the defect has a top surface area that is larger than 0.1, 0.2, 0.3, 0.4, 0.5, 0.6, 0.7, 0.8, 0.9, or 1 square millimeters, or if the defect as a volume larger than 0.1, 0.2, 0.3, 0.4, 0.5, 0.6, 0.7, 0.8, 0.9, or 1 cubic millimeters. In some embodiments, the defect analysis subsystem 18 can be programmed to require correction if the ratio of the size of the defect to the size of the sequential layer is more than about 0.001, 0.002, 0.003, 0.004, 0.005, 0.006, 0.007, 0.008, 0.009, 0.01, 0.02, 0.03, 0.04, 0.05, 0.06, 0.07, 0.08, 0.09, or 0.01.

In some embodiments, the defect analysis subsystem 18 can include a defect analysis subsystem controller 44 with computer readable instructions that when executed are operable to run a defect fatigue life model which can determine a usable life of the product 14 including the defect 22 when subject to a simulated loading over time, and the defect analysis subsystem controller 44 can be programmed to send the correction command to the AM device 12 when the determined usable life of the product 14 with the defect 22 is less than a predetermined minimum usable life value. One example of a suitable fatigue life model for determining whether a correction is needed for a particular defect can include the DigitalClone® software developed by Sentient Science Corporation. Sentient's DigitalClone® is a physics-based computational modeling and design framework that simulates the microstructure of different components and their behavior, calculates internal stresses caused by different applied loading conditions, accumulated internal damage resulting in crack nucleation and propagation, and investigates the performance and life prediction of the part being analyzed. Details of the DigitalClone® fatigue life modeling process as applied to transmission and power components can be found in U.S. Pat. No. 10,474,772, which is incorporated by reference herein in its entirety. The DigitalClone® modeling methods can be tailored to account for simulated loads to be applied to the product 14 being manufactured by the AM device 12 in order to determine a fatigue life of the part with the defect. the DigitalClone® model can also be tailored to take key AM process parameters (e.g. laser power, scan speed, hatch strategy, layer thickness) as inputs, and simulate part-level distortion and residual stress, as well as the microstructure (e.g. grain structure, porosity) of as-build parts in an AM process, and fatigue performance when the part is used in the field. Determining whether correction is needed based on a modeled fatigue life of the product 14 including the defect 22 can help reduce the number of repairs made to the product for defects that would not unacceptably alter the usable life of the product 14.

In some embodiments, the defect analysis subsystem controller 44 can include computer readable instructions that when executed are operable to determine whether the product 14 with the defect 22 meets predetermined quality standards, and the defect analysis subsystem controller 44 can be programmed to send the correction command when the product 14 does not meet one or more of the predetermined quality standards. Such quality standards can include, but are not limited to, strength, elasticity, size requirements, porosity, durability, hardness, etc. In some embodiments, the controller 44 can scan the product 14 with the defect 22 and compare a scanned image of the product 14 with a two-dimensional or three-dimensional CAD file of the desired geometry of the product 14. If the scanned image deviates too far from the desired geometry of the product 14 as shown in the CAD file, the controller 44 can be programmed to require correction of the defect 22.

Figure 17:
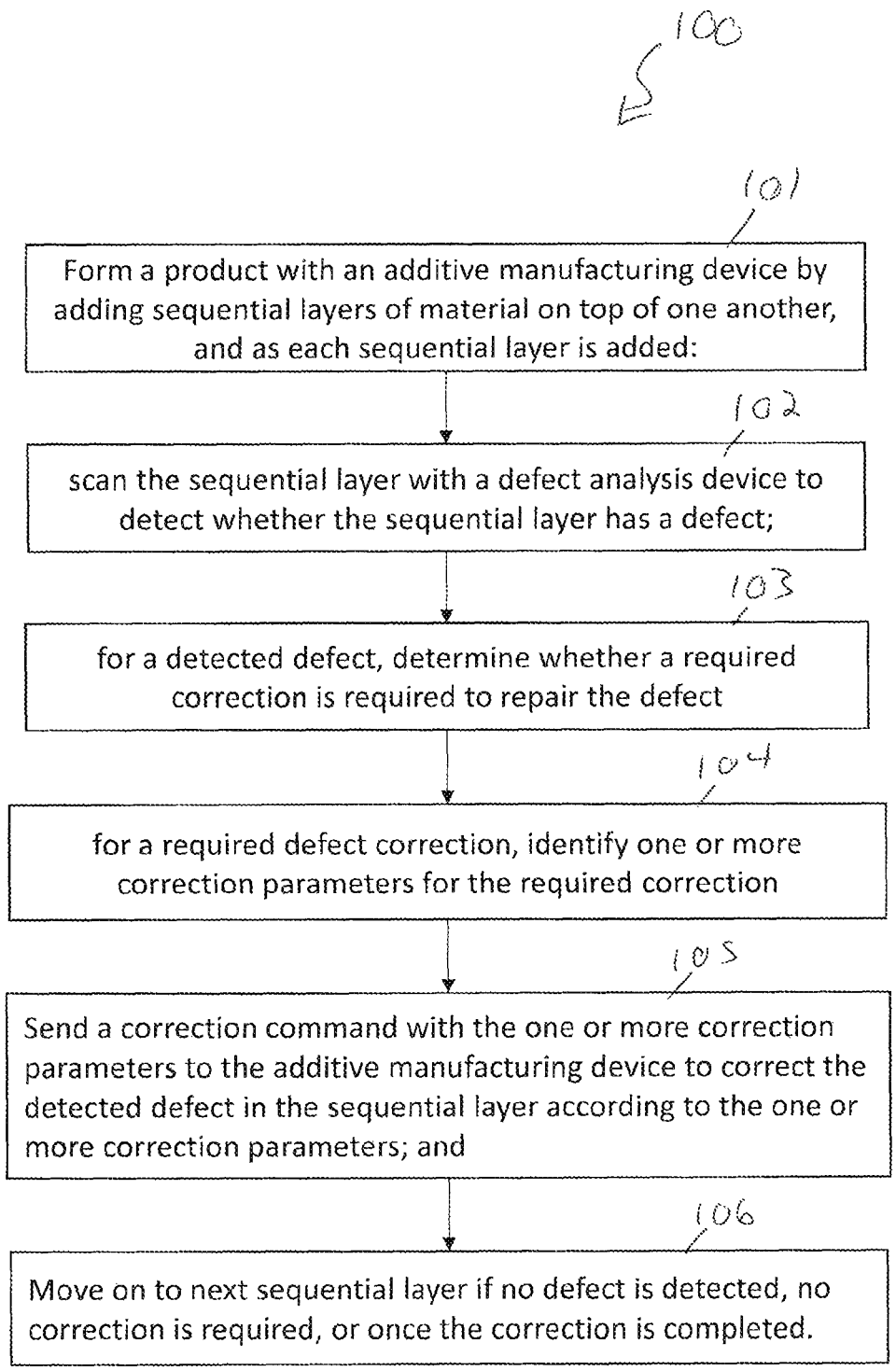
FIG. 17 is a flow chart of an embodiment of a method of the present disclosure of detecting and correcting defects in sequential layers of an additive manufacturing process.

Another aspect of the present disclosure is an additive manufacturing method 100, shown in FIG. 17, including the steps of forming a product with an additive manufacturing device by adding sequential layers of material on top of one another 101; and as each sequential layer of material is added: scanning the sequential layer with a defect analysis subsystem to detect whether the sequential layer has a defect 102; determining whether a required correction is needed to repair a detected defect 103; identifying correction parameters for a required defect correction 104; and sending a correction command with the correction parameters to the additive manufacturing device, the correction command causing the additive manufacturing device to perform a correction procedure to help correct the defect in the sequential layer according to the correction parameters 105 prior to moving on to the next layer 106. In some embodiments, for at least one sequential layer, the method can include scanning the sequential layer as it is being added with a defect analysis subsystem to detect a defect and determining that a defect correction is required to repair the defect. If no defect is detected, or if it is determined that no correction is needed when a defect is detected, the additive manufacturing device can move on to the next sequential layer.

In some embodiments, performing the correction procedure comprises removing at least a portion of the sequential layer and reforming the removed portion of the sequential layer on the product. Removing at least a portion of the sequential layer comprises machining off at least a portion of the sequential layer, for instance via a drill, milling machine, lathe, grinding machine, saw, etc. In some embodiments, forming the product can include for each sequential layer placing a material powder over the product and melting the material powder with a high energy density beam to form the sequential layer, and correcting the detected defect in the sequential layer comprises remelting the sequential layer with the high energy density beam adjacent or around the defect. Additional material powder can be added before or during the remelting process, for instance to help fill void defects in the product.

In some embodiments, when it is determined that correction of the defect is required, the method can further include querying with the defect analysis subsystem a database including a plurality of defect profiles and corresponding suggested correction parameters for each defect profile; selecting via the defect analysis subsystem one of the defect profiles in the database that is an approximation of the detected defect; and including the suggested correction parameters corresponding to the selected defect profile in the correction command sent to the additive manufacturing machine.

In some embodiments, the defect analysis subsystem includes a thermal imaging system oriented to view and capture thermal images of the sequential layer as it is formed, and a processor or controller communicated with the thermal imaging system, the processor including computer executable instructions which when executed analyze the thermal images captured by the thermal imaging system to detect the defect in the sequential layer, determine whether correction is required, and identify correction parameters to perform a correction procedure to help correct the defect.

In some embodiments, each subsequent layer includes two or more sublayers, and the method can include detecting a defect in one of the sublayers of the sequential layer and waiting until one or more of the remaining sublayers are formed before performing the correction procedure. Such a method can allow for the opportunity for the defect to be at least partially corrected by the melting of an additional sublayer such that correction may not be required. If the defect is enhanced or exacerbated during the formation of the next sublayer, then correction of both sublayers can be directed and performed.

In some embodiments, defects can be monitored over time for products being built to the same specs. An initial product can be a first product, and the method can be performed for a second product having the same specifications as the first product, the defect analysis subsystem detecting a second defect in the second product. The method can further include: comparing the detected defects in the first product and the second product; and calibrating the additive manufacturing device based on the comparison of the defects between the first product and the second product. For instance, if more or larger key hole voids or lack of fusion porosity defects are detected over time, it can indicate that the laser power speed or the laser power may becoming decalibrated and needs correction.

Monitoring defects over time in products that are intended to be substantially identical can help determine if the additive manufacturing device is in need of recalibration. As the additive manufacturing device becomes decalibrated with continued use, larger or more frequent defects can be produced in subsequent products. Monitoring and comparing the progression of defects in similarly built products over time as the layers of the products are being scanned to identify and correct defects in real time can provide the additional advantage of helping the operator monitor the status of the calibration of the additive manufacturing machine and recalibrate the additive manufacturing machine as needed, which can help reduce the formation of defects in subsequent products 14. All the while the system and method disclosed herein can still detect and correct defects that are formed in the products 14 despite such calibrations.

Thus, although there have been described particular embodiments of the present invention of a new and useful Systems And Methods For Defect Detection And Correction In Additive Manufacturing Processes, it is not intended that such references be construed as limitations upon the scope of this invention.

What is claimed is:

1. A system of correcting defects in an additive manufacturing process comprising:
an additive manufacturing device operable to form a first product and a second product by adding sequential layers of material on top of one another, wherein the additive manufacturing device is calibrated based on a comparison of a detected defect in the first product and a detected defect in the second product; and a defect analysis subsystem communicated with the additive manufacturing device, wherein as each sequential layer of material is added, the defect analysis subsystem is operable to:

monitor the sequential layer to detect whether the sequential layer has any defects;

for a detected defect, determine whether defect correction is required;

for a required defect correction, identify one or more correction parameters for the required defect correction; and send a correction command with the one or more correction parameters to the additive manufacturing device, the correction command causing the additive manufacturing device to perform a correction procedure to the detected defect in the sequential layer according to the correction parameters prior to moving on to a next sequential layer;

wherein the detected defect in the first product and the detected defect in the second product are detected by the defect analysis subsystem.

2. The system of claim 1, wherein the correction parameters of the correction command include instructions to remove the entire sequential layer and reforming the sequential layer with the additive manufacturing device.

3. The system of claim 1, wherein the correction parameters of the correction command include instructions to form a melt pool at desired operating parameters around the detected defect in the sequential layer.

4. The system of claim 1, wherein the defect analysis subsystem further comprises a database including a plurality of defect profiles and corresponding suggested correction parameters for each defect profile, and when the defect analysis subsystem determines that a detected defect requires correction, the defect analysis subsystem is operable to select one of the defect profiles in the database that is an approximation of the detected defect and include the suggested correction parameters corresponding to the selected defect profile in the correction command sent to the additive manufacturing device.

5. The system of claim 3, wherein the correction parameters cause the melt pool to have a melt pool size that is at least 20 percent greater than a size of the detected defect.

6. The system of claim 1, wherein the defect analysis subsystem includes a manual correction command input, and determining whether the detected defect requires correction further comprises receiving a manual correction command at the manual correction command input to perform a correction.

7. The system of claim 1, wherein to determine whether defect correction is needed, the defect analysis subsystem is operable to determine a size of the detected defect and programmed to require correction if the size of the detected defect exceeds a predetermined minimum defect size or if a ratio of the size of the detected defect to the size of the sequential layer exceeds a predetermined minimum defect ratio.

8. The system of claim 1, wherein the defect analysis subsystem further comprises a defect analysis subsystem controller with computer readable instructions that when executed are operable to run a defect fatigue life model which can determine a usable life of the product including the detected defect when subject to a simulated loading over time, and the defect analysis subsystem controller is programmed to send the correction command when the determined usable life of the product with the detected defect is less than a predetermined minimum usable life value.

9. The system of claim 1, wherein the defect analysis subsystem further comprises a defect analysis subsystem controller with computer readable instructions that when executed are operable to determine whether the product with the detected defect meets predetermined quality standards, and the defect analysis subsystem controller is programmed to send the correction command when the product with the detected defect does not meet one or more of the predetermined quality standards.

\* \* \* \* \*